United States Patent [19]

Takiguchi et al.

[11] Patent Number: 5,800,309
[45] Date of Patent: Sep. 1, 1998

[54] HYDRAULIC CONTROL DEVICE FOR AUTOMATIC TRANSMISSION

[75] Inventors: Masahiro Takiguchi; Yoshifumi Fujita, both of Fuji, Japan

[73] Assignee: Jatco Corporation, Japan

[21] Appl. No.: 703,568

[22] Filed: Aug. 28, 1996

[30] Foreign Application Priority Data

Aug. 28, 1995 [JP] Japan .................................. 7-219063

[51] Int. Cl.$^6$ ............................................. F16H 61/08
[52] U.S. Cl. .......................... 477/144; 477/145; 477/149
[58] Field of Search ................................ 477/144, 145, 477/146, 149, 156, 158, 132, 133, 135, 136, 140, 141

[56] References Cited

U.S. PATENT DOCUMENTS

| | | | |
|---|---|---|---|
| 4,933,850 | 6/1990 | Wheeler | 477/144 |
| 5,029,494 | 7/1991 | Lentz et al. | 477/149 |
| 5,046,174 | 9/1991 | Lentz et al. | 477/144 |
| 5,070,747 | 12/1991 | Lentz et al. | 477/144 |
| 5,085,105 | 2/1992 | Wakahara et al. | 477/149 |
| 5,092,199 | 3/1992 | Goto et al. | 477/133 |

Primary Examiner—Charles A. Marmor
Assistant Examiner—Sherry Lynn Estremsky
Attorney, Agent, or Firm—Rossi & Associates

[57] ABSTRACT

A hydraulic control device determines whether the transmission is being shifted down, and upon determination of the shift-down action, determines whether the vehicle is in a power-on condition or in a power-off condition. Upon determination of the power-off condition, the hydraulic control device regulates the control oil pressure applied to the engaging element, such that the oil pressure is rapidly increased from the beginning of a shifting process, and is maintained at a high level until the shifting process is about to be completed. Upon determination of the power-on condition, the control device regulates the control oil pressure such that the oil pressure is maintained at a low level from the beginning of the shifting process, and is increased just before completion of the shifting process.

4 Claims, 13 Drawing Sheets

|     | REV/C | H/C | LOW/C | L&R/B | LOW O W C | B/B |
|-----|-------|-----|-------|-------|-----------|-----|
| 1st |       |     | ○     | ◌     | ◍         |     |
| 2nd |       |     | ○     |       |           | ○   |
| 3rd |       | ○   | ○     |       |           |     |
| 4th |       | ○   |       |       |           | ○   |
| REV | ○     |     |       | ○     |           |     |

| GEAR \ SOLENOID | SHIFT SOLENOID A | SHIFT SOLENOID B |
|---|---|---|
| 1st GEAR | ○ | ○ |
| 2nd GEAR | × | ○ |
| 3rd GEAR | × | × |
| 4th GEAR | ○ | × |

○ ···· ON (DRAIN CIRCUIT CLOSED)
× ···· OFF (DRAIN CIRCUIT OPEN)

HYDRAULIC CONTROL DEVICE FOR AUTOMATIC TRANSMISSION

BACKGROUND OF THE INVENTION

1. Field of the Invention

The present invention relates to a hydraulic control device for an automatic transmission, and in particular to a technique for regulating a pressure applied to an engaging element in the process of shifting down the transmission.

2. Description of the Prior Art

There is known a device for controlling an oil pressure during a shifting process while the transmission is being shifted down, as disclosed in Japanese Patent Application Laid-open No. 6-11030.

This publication discloses a technique for keeping a constant engaging timing of an engaging element to be engaged upon down-shifting even if an oil temperature of a working oil changes, in order to obtain a good shift feeling during the shift-down process irrespective of the level of the oil temperature. More specifically, the device disclosed in this publication is adapted to start increasing the oil pressure at an earlier stage of the shifting process when the oil temperature is low, as compared with when the oil temperature is high.

In the conventional hydraulic control device, however, only the oil temperature is considered as a cause of inducing shift shocks and deteriorating the shift feeling. In fact, the shift shock characteristic and shift feeling are deteriorated when the oil pressure is controlled in the same manner during the shift-down process when the vehicle is in a power-on condition, e.g., with an accelerator pedal being pushed down, and when the vehicle is in a power-off condition, e.g., with an engine brake being selected.

More specifically, the engine speed (turbine speed), i.e., the rotating speed of the engine, increases by itself during the shifting in the power-on condition, whereas the engine speed (turbine speed) does not increase by itself during the shifting in the power-off condition. If an oil pressure characteristic during the shifting process is predetermined such that a clutch (engaging element) is engaged at a point of time when input and output shafts of the transmission rotate in synchronization with each other upon down-shifting in the power-on condition, and the same oil pressure characteristic is employed as it is upon down-shifting in the power-off condition, the engine speed (turbine speed) is increased at a low rate, and the delay in the increase of the engine speed prevents the transmission from being shifted down in the synchronized state, whereby shocks may occur due to an excessive capacity of the clutch upon termination of a hold-up state or steady-state level of an accumulator pressure.

SUMMARY OF THE INVENTION

It is an object of the present invention to provide a hydraulic control device for an automatic transmission, for regulating an oil pressure applied to an element that is engaged during a shift-down process, wherein a good shift feeling can be obtained when the down-shifting is effected both in a power-on mode and a power-off mode.

The above object may be accomplished according to the principle of the present invention, which provides a hydraulic control device for an automatic transmission of a vehicle comprising: an engaging element that is engaged by a control oil pressure when the transmission is shifted down; down-shifting determining means for determining whether the transmission is being shifted down; power-on/off determining means for determining, upon determination of down-shifting of the transmission, whether the vehicle is in a power-on condition in which drive force is transmitted from an engine to wheels through a power transmitting system, or in a power-off condition in which the drive force received from the wheels exceeds that from the engine, thereby to apply brake force to the power transmitting system; power-off hydraulic control means for regulating the control oil pressure applied to the engaging element, such that the oil pressure is rapidly increased from the beginning of a shifting process, and is maintained at a high level until the shifting process is about to be completed; and power-on hydraulic control means for regulating the control oil pressure applied to the engaging element, such that the oil pressure is maintained at a low level from the beginning of the shifting process, and is increased just before completion of the shifting process. In this arrangement, a good shift feeling can be obtained when the down-shifting is effected both in the power-on mode and power-off mode.

Referring to FIG. 1, when the down-shifting determining means b determines that the transmission is being shifted down while the vehicle is running, the power-on/off determining means c determines whether the vehicle is in the power-on condition in which the drive force is transmitted from the engine to the wheels through the power transmitting system, or in the power-off condition in which the drive force received from the wheels exceeds that from the engine, whereby the brake force is applied to the power transmitting system.

If it is determined that the down-shifting takes place in the power-off condition, the power-off hydraulic control means d regulates the control oil pressure applied to the engaging element a, such that the oil pressure is rapidly increased from the beginning of the shifting process, and then maintained at a high level until the shifting is about to be completed or terminated.

If it is determined that the down-shifting takes place in the power-on condition, the power-on hydraulic control means e regulates the control oil pressure applied to the engaging element a, such that the oil pressure is held at a low level from the beginning of the shifting process, and then increased just before completion or termination of the shifting process.

In this manner, the oil pressure to the engaging element a is rapidly established upon down-shifting in the power-off condition, so that the turbine speed (engine speed) is raised or increased in an early period of the shifting process, thus reducing the time required to complete the shifting process. If the control to be effected in the power-on condition is effected in the power-off condition, the increase in the turbine speed is delayed since the turbine runner (or engine) itself does not increase its speed in the power-off condition. This delay eventually retards the shifting process, and causes shocks due to an excessive capacity of the engaging element at the end of the time during which the accumulate pressure is kept at a steady-state level or held as a so-called shelf pressure.

Upon down-shifting in the power-on condition, the oil pressure applied to the engaging element a is kept at a low level, to thus create a standby condition in which the engaging element is kept from engaging, so that the turbine speed (engine speed) rapidly increases by itself. Thereafter, the oil pressure is increased just before completion of the shifting so that the engaging element a is engaged at a point of time when the input and output shafts of the transmission rotate in synchronization with each other, whereby shift shocks can be suppressed. If the control to be effected in the power-off condition is effected in the power-on condition, the turbine speed is increased to an excessive extent due to a rapid increase in the oil pressure to the engaging element in addition to rotation of the turbine runner itself in the power-on condition, whereby shocks occur due to a sharp drop in a transmission torque.

In one preferred form of the hydraulic control device as described above, the power-on/off determining means employs a power-on/off map which is divided into a power-on region and a power-off region on the basis of a throttle opening, and determines whether the vehicle is in the power-on condition or the power-off condition depending upon which region of the power-on/off map the throttle opening that is currently detected belongs to.

In another form of the hydraulic control device as described above, the power-on/off determining means employs a power-on/off map which is divided into a power-on region and a power-off region on the basis of a throttle opening and a vehicle speed, and determines whether the vehicle is in the power-on or power-off condition depending upon which region of the power-on/off map the throttle opening and vehicle speed that are currently detected belong to.

In determining whether the vehicle is in the power-on or power-off condition, the power-on/off determining means c may determine which one of the power-on region and power-off region of the power-on/off map the currently detected throttle opening, or throttle opening and vehicle speed is/are located. Since the boundary between the power-on region and power-off region on the power-on/off map extends in close relationship with the road-load line, the power-on/off condition can be determined with higher accuracy, as compared with the case where the same determination is made only on the basis of a signal received from a switch for fully closing the throttle valve.

When the power-on/off condition is determined on the basis of the throttle opening and the vehicle speed, the power-off range expands as the vehicle speed is increased, and the determination may be made with further improved accuracy, while dealing with increases in the friction or load in input and output systems due to the increase in the vehicle speed.

In the hydraulic control device in which the power-on/off condition is determined on the basis of the throttle opening, or the throttle opening and the vehicle speed, the power-on/off map may be prepared individually on the basis of at least one of a gear position, an ON/OFF state of a lock-up clutch, a range position, and an oil pressure.

When the gear position is selected, for example, the power-on region expands as the transmission is placed in the lower gear position in which the road-load line is present on the side of a relatively small opening angle of the throttle valve. When the ON/OFF state of the lock-up clutch is selected, the power-on range expands when the lock-up clutch is in the ON state in which shocks are desired to be reduced. When the range position is selected, the power-on range expands when the shift lever is placed in the D (drive) range in which shocks are desired to be reduced, and the power-off range expands when the shift lever is placed in the manual range in which the shifting time is desired to be reduced. In the case of the oil temperature, the power-off range expands when the oil pressure is low and the shifting time is desired to be reduced.

With the power-on/off map thus prepared in more detail in view of the above parameters, the power-on/off condition can be more accurately determined in response to changes in the gear position, ON/OFF state of the lock-up clutch, range position, and oil temperature.

The above-indicated power-off hydraulic control means d and power-on hydraulic control means e of the hydraulic control device according to the present invention may be adapted to control a line pressure that is regulated by a pressure regulator valve.

When it is determined that the transmission is shifted down in the power-off condition, the power-off hydraulic control means d creates or regulates the line pressure directly led to the engaging element a, such that the line pressure is rapidly increased from the beginning of the shifting process, and maintained at a high level until the shifting is about to be terminated. Upon determination of the down-shifting in the power-on condition, the power-on hydraulic control means d creates or regulates the line pressure, such that the line pressure is kept at a low level from the beginning of the shifting process, and then increased just before completion of the shifting process.

The power-off hydraulic control means d and power-on hydraulic control means e of the present hydraulic control device may also be adapted to control a back pressure of an accumulator disposed in an oil path leading to the engaging element to be engaged upon down-shifting.

When it is determined that the transmission is shifted down in the power-off condition, the power-off hydraulic control means d creates or regulates the back pressure of the accumulator disposed in the oil path leading to the engaging element a, such that the accumulator back pressure is rapidly increased from the beginning of the shifting process, and then maintained at a high level until the shifting is about to be completed. Upon determination of the down-shifting in the power-off condition, the power-on hydraulic control means d creates or regulates the accumulator back pressure such that the oil pressure is kept at a low level from the beginning of the shifting process, and then increased just before completion of the shifting process.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Initially, there will be schematically described the whole construction of an automatic transmission in which a down-shifting hydraulic control device according to the first embodiment of the present invention is used.

Figure 1:
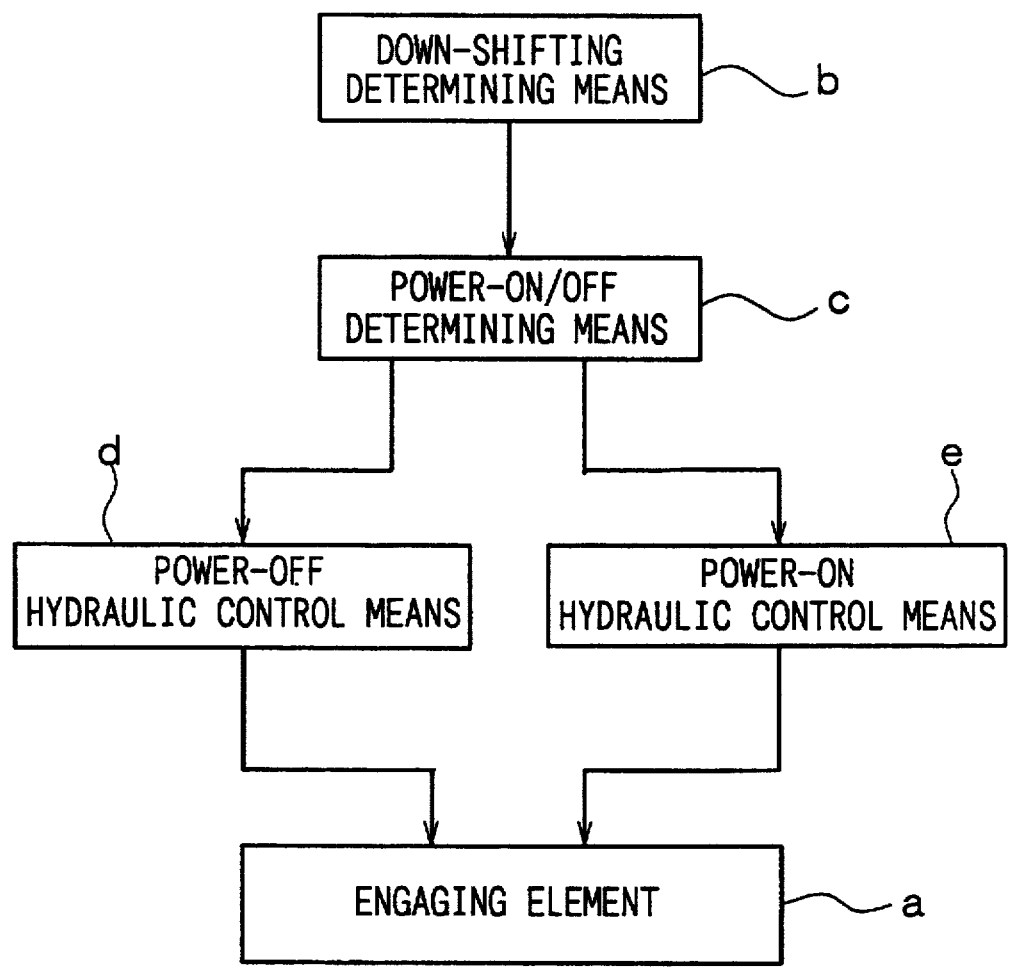
FIG. 1 is a view showing a hydraulic control device for an automatic transmission according to the present invention.
Figures 2, 3:
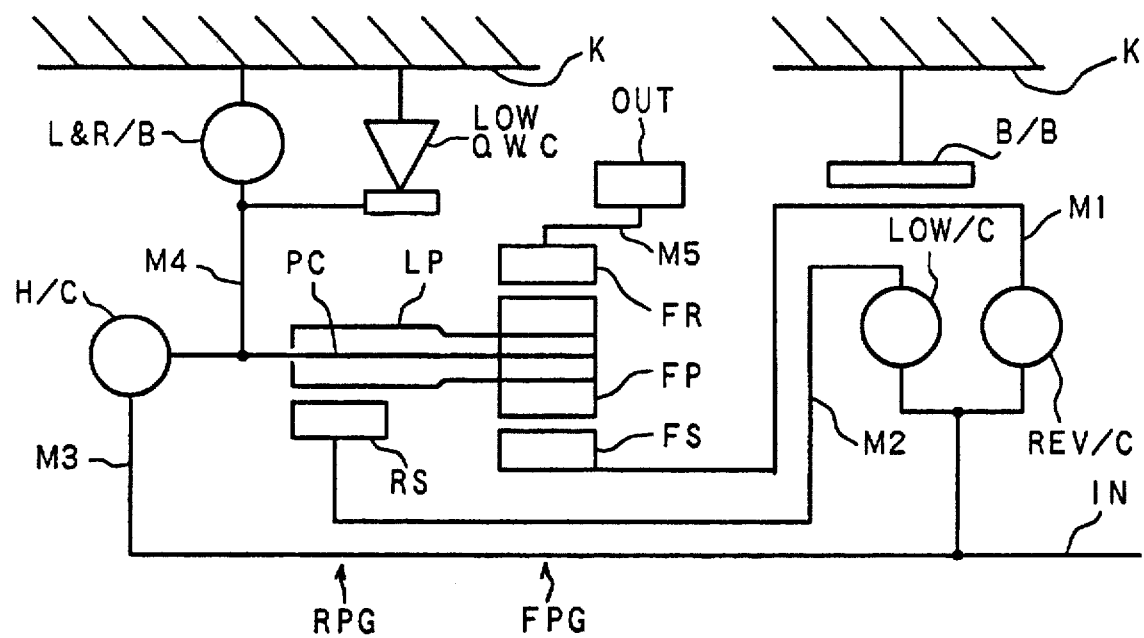
FIG. 2 is a view schematically showing a power transmitting system of the automatic transmission using the hydraulic control device as the first embodiment of the invention.
FIG. 3 is a view showing engaged states of elements of the automatic transmission using the hydraulic control device of the first embodiment.

FIG. 2 is a view schematically showing a power transmitting system of the automatic transmission. In FIG. 2, IN is an input shaft, and OUT is an output gear, while FPG is a front planetary gear system, and RPG is a rear planetary gear system. The front planetary gear system FPG includes a front sun gear FS, a front ring gear FR, and a front pinion FP that is engageable with both of the gears FS, FR. The rear planetary gear system RPG includes a rear sun gear RS, and a long pinion LP that is engageable with the gear RS and also with the front pinion FP. The front pinion FP and the long pinion LP are both supported by a common carrier PC.

In the above-described gear train arrangement, four members, i.e., front sun gear FS, rear sun gear RS, common carrier PC, and front ring gear FR, are involved in a shifting action of the transmission. Further, there are provided a reverse clutch REV/C, high clutch H/C, low clutch LOW/C, low & reverse brake L&R/B, low one-way clutch LOW O.W.C, and band brake B/B, which serve as shifting elements for connecting a selected one or ones of the above four members to the input shaft IN or fixing the selected one member(s) to a case K, so as to establish forward 4-speed, reverse 1-speed gear positions.

The front sun gear FS is connected to the input shaft IN through a first rotary member M1 and the reverse clutch REV/C, and also connected to the case K through the first rotary member M1 and the band brake B/B. The rear sun gear RS is connected to the input shaft IN through a second rotary member M2 and the low clutch LOW/C. The common carrier PC is connected to the input shaft IN through the high clutch H/C and a third rotary member M3, and is also connected to the case K through a fourth rotary member M4, and the low & reverse brake L&R/B and low one-way clutch LOW O.W.C connected in series with each other. The front ring gear FR is connected to the output gear OUT through a fifth rotary member M5.

This power transmitting system is characterized in that it does not include a one-way clutch for controlling the shift timing so as to eliminate shift shocks upon shifting-down from the 4th-speed to 3rd-speed gear position, and a clutch that is engaged due to oil pressure and needed for ensuring the effect of engine braking when the above one-way clutch is employed. Thus, the number of shifting elements is reduced, leading to reduced size and weight of the power transmitting system.

FIG. 3 is a view showing engaged and unengaged states of the shifting elements of the above-described power transmitting system for establishing the forward 4-speed, reverse 1-speed gear positions.

The 1st-speed gear position is established by hydraulically engaging the low clutch LOW/C, and hydraulically engaging the low & reverse brake L&R/B (when an engine brake range is selected) or mechanically engaging the low one-way clutch LOW O.W.C (when the vehicle is accelerated). In this case, the rear sun gear RS is connected to the input shaft IN, and the common carrier PC is fixed, while the front ring gear FR is connected to the output gear OUT.

The 2nd-speed gear position is established by hydraulically engaging the low clutch LOW/C and the band brake B/B. In this case, the rear sun gear RS is connected to the input shaft IN, and the front sun gear FS is fixed, while the front ring gear FR is connected to the output gear OUT.

The 3rd-speed gear position is established by hydraulically engaging the high clutch H/C and the band brake B/B. In this case, the rear sun gear RS and common carrier PC are concurrently connected to the input shaft IN, and the front ring gear FR is connected to the output gear OUT, so that the transmission gear ratio becomes equal to 1.

The 4th-speed gear position is established by hydraulically engaging the high clutch H/C and the band brake B/B. In this case, the common carrier PC is connected to the input shaft IN, and the front sun gear FS is fixed, while the front ring gear FR is connected to the output gear OUT, so as to establish the overdrive gear position.

The reverse gear position is established by hydraulically engaging the reverse clutch REV/C and the low & reverse brake L&R/B. In this case, the front sun gear FS is connected to the input shaft IN, the common carrier PC is fixed, while the front ring gear FR is connected to the output gear OUT.

Figure 4:
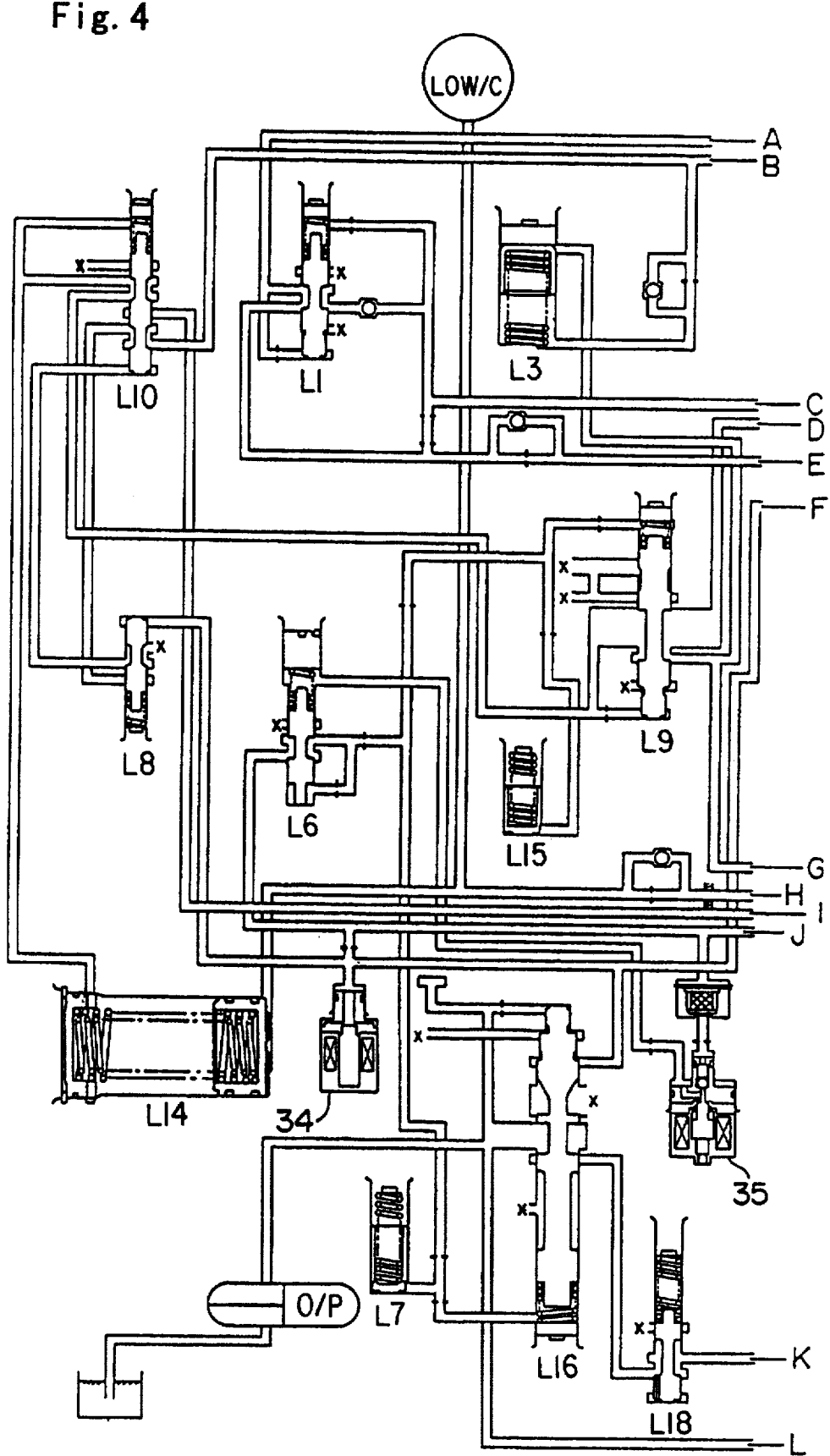
FIG. 4 is a view showing the left half of a whole hydraulic circuit of a control valve system that constitutes the hydraulic control device of the first embodiment.
Figure 5:
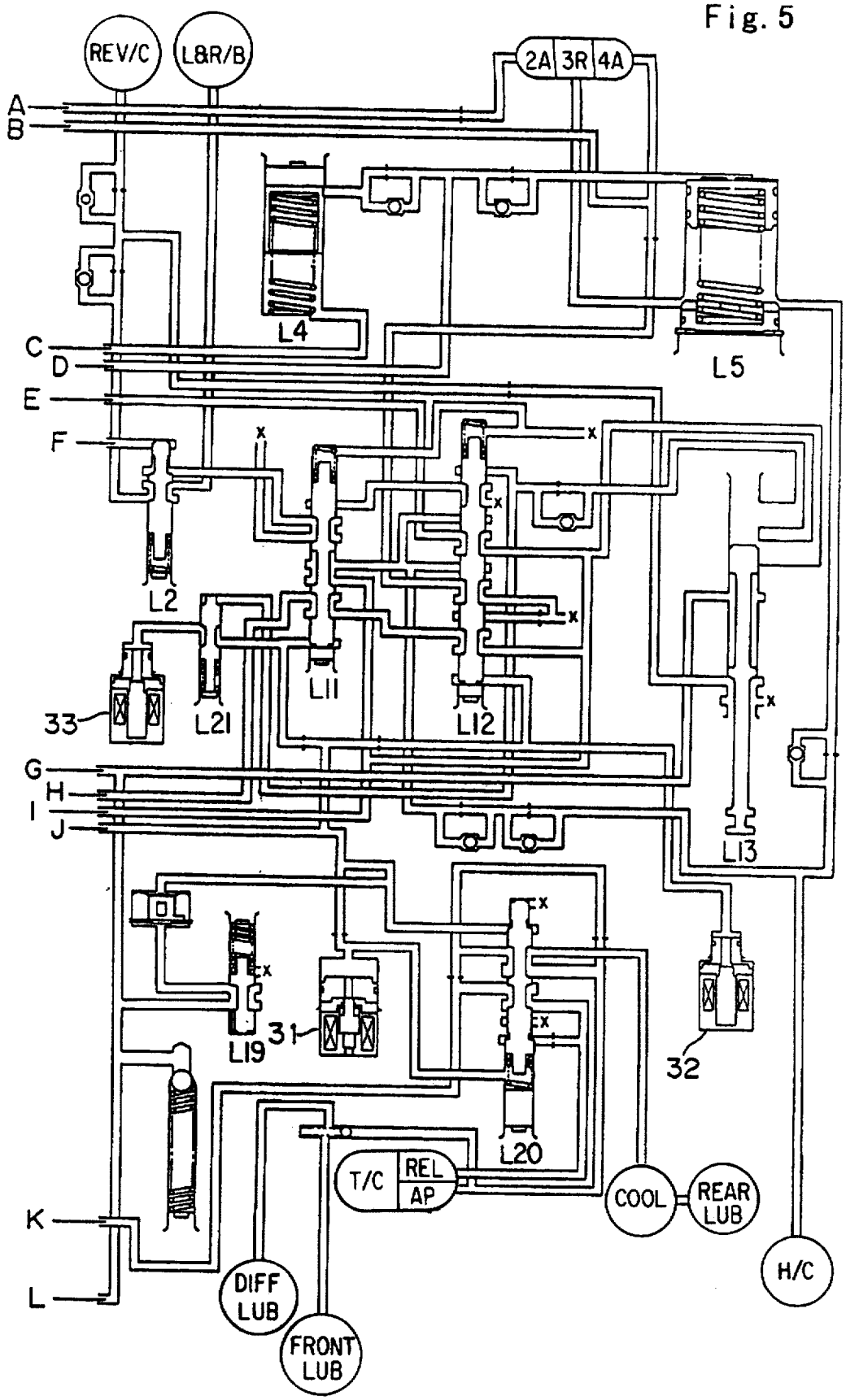
FIG. 5 is a view showing the right half of the whole hydraulic circuit of the control valve system that constitutes the hydraulic control device of the first embodiment.

FIGS. 4 and 5 are hydraulic circuit diagrams showing the whole control valve system. In FIGS. 4 and 5, L16 is a pressure regulator valve for controlling a pressure discharged from an oil pump to a line pressure depending upon the level of a pressure modified pressure. L6 is a pressure modifier valve for reducing a pilot pressure to prepare the pressure modifier pressure. L19 is a pilot valve for reducing the line pressure to prepare the pilot pressure as a constant pressure. L9 is an accumulator control valve for reducing the line pressure depending upon the level of the pressure modifier pressure, to prepare an accumulator control pressure. L18 is a torque converter pressure regulator valve for reducing the line pressure to prepare a torque converter pressure. L17 is a line pressure relief valve for defining the upper limit of the line pressure.

L12 and L11 are shift valve A and shift valve B, respectively, which effect switching of oil paths to establish each of the 1st-speed to 4th-speed (overdrive) gear positions according to the operation of shift solenoids. L20 is a lock-up control valve for selectively engaging and releasing a lock-up clutch according to the operation of a lock-up solenoid. This valve L20 also functions as a pressure regulator valve during switching from an engaged state of the lock-up clutch to its released state and vice versa. L2 is a reverse inhibit valve for switching a circuit for applying the line pressure to the low & reverse brake according to the operation of a timing solenoid. L13 is a manual valve for delivering the line pressure to an appropriate control valve or valves according to a selected position of a shift lever. L21 is a 2nd-speed hold valve for achieving a 2nd-speed gear ratio by placing the shift lever in a 1st-speed range, without operating an electronic control system.

L10 and L8 are low clutch sequence valve and low clutch timing valve, respectively, for appropriately controlling the timing of engaging and releasing the low clutch upon shifting-up to the 4th-speed gear position or shifting-down from the 4th-speed gear position. L14 is a low clutch accumulator for smoothly engaging the low clutch and also appropriately controlling the timing of engaging and releasing the low clutch. L1 and L2 are 1-2 modulator valve and 1-2 accumulator piston, respectively, which serve to smoothly engage the brake band upon shifting from the 1st-speed gear position to the 2nd-speed gear position. L5 is a 2-3 accumulator for smoothly engaging the high clutch and releasing the brake band upon shifting from the 2nd-speed gear position to the 3rd-speed gear position. L3 is a 3-4 accumulator for smoothly engaging the brake band upon shifting from the 3rd-speed gear position to the 4th-speed gear position. L15 and L7 are modifier accumulator and line-pressure accumulator, respectively, for preventing pulsation of the modifier pressure and thus leveling this pressure.

In FIGS. 4 and 5, 31 is the lock-up solenoid, 32 is a shift solenoid A, 33 is a shift solenoid B, 34 is the timing solenoid, 35 is a line-pressure solenoid, O/P is the oil pump, and T/C is the torque converter. Of the above-indicated solenoids, the lock-up solenoid 31 and line-pressure solenoid 35 are duty solenoids, and the shift solenoid A (32), shift solenoid B (33) and timing solenoid 34 are on-off solenoids. The lock-up clutch is incorporated in the torque converter T/C.

In the upper right portion of FIG. 5, 2A is a 2nd-speed engaging pressure chamber of a band servo piston for operating the band brake B/B, 3R is a 3rd-speed releasing pressure chamber, and 4A is a 4th-speed engaging pressure chamber. The band brake B/B is engaged due to the hydraulic operation of the pressure chamber 2A only, and released due to the hydraulic operation of the pressure chambers 2A and 3R. The band brake B/B is also engaged due to the hydraulic operation of the pressure chambers 2A, 3R and 4A.

Figure 6:
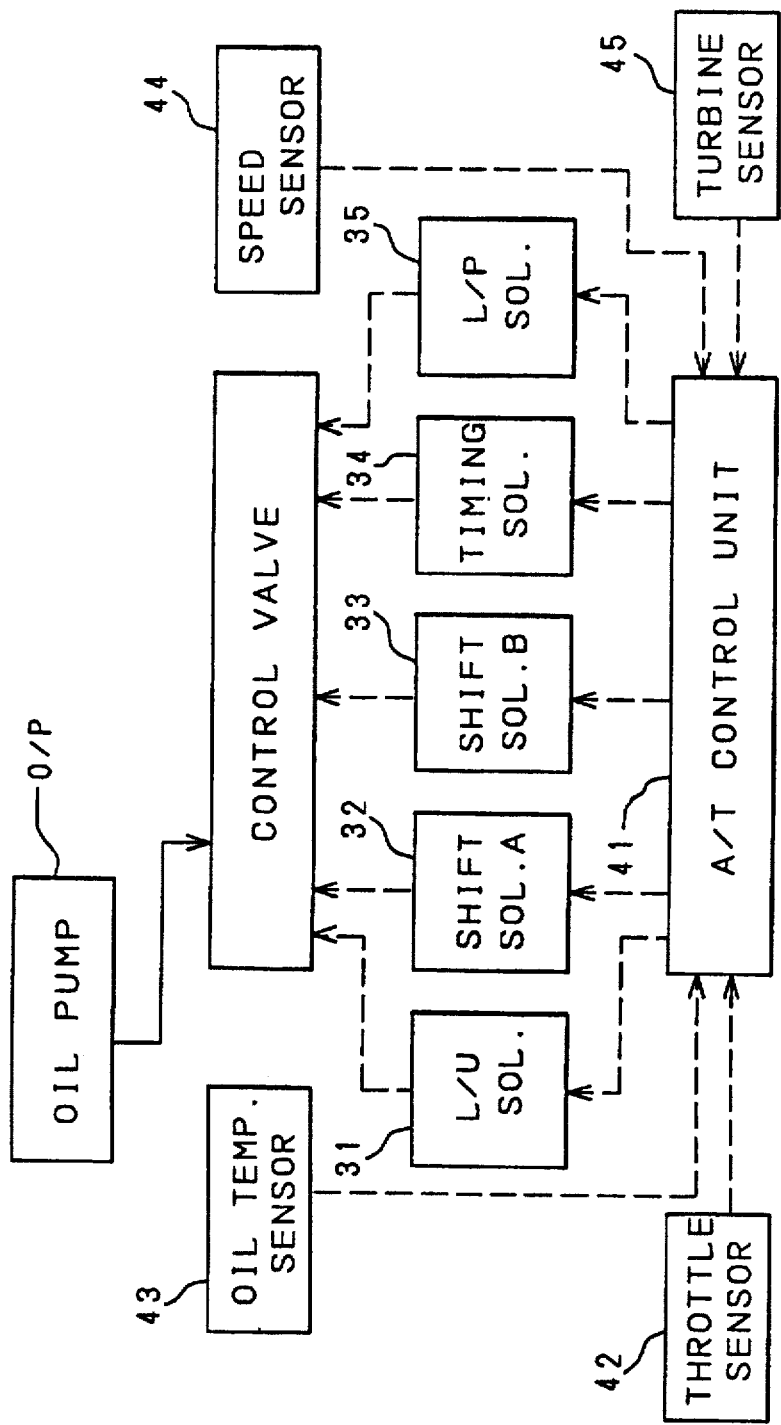
FIG. 6 is a block diagram of an electronic control system for the hydraulic control device of the first embodiment.

FIG. 6 is a block diagram of an electronic control system for controlling the above hydraulic control device. The above-indicated solenoids 31, 32, 33, 34 and 35 are driven or controlled by an A/T control unit 41. This A/T control unit 41 receives signals from various sensors, such as a throttle sensor 42, oil temperature sensor 43, vehicle speed sensor 44, and turbine sensor 45, and various switches. The A/T control unit 41 effects arithmetic processing on the basis of input information including detected signals, and predetermined control rules.

Figures 7, 8:
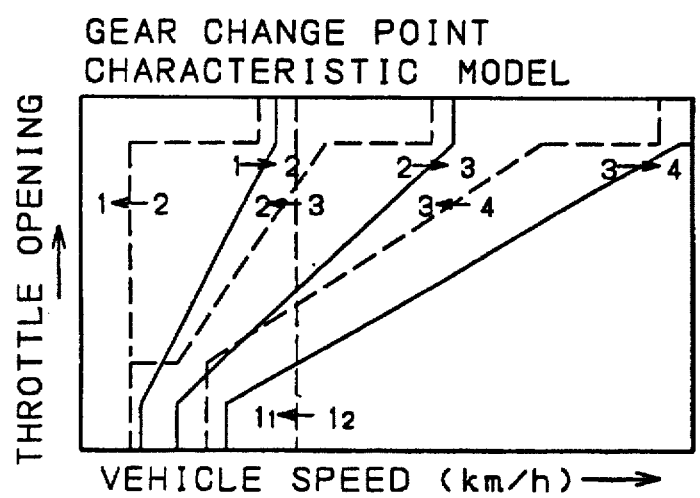
FIG. 7 is a view showing a table of operated states of shift solenoids of the hydraulic control device of the first embodiment.
FIG. 8 is a view showing one example of characteristics of gear change points at which the transmission is shifted from one gear position to another.

FIG. 7 is a view showing a table of operated states of the shift solenoids A, B, and FIG. 8 is a view showing one example of gear change points at which the transmission gear ratio is changed.

The shift control by means of the shift solenoid A (32) and shift solenoid B (33) is effected by determining an appropriate gear position, on the basis of the gear change points as shown in FIG. 8 and detected throttle opening and vehicle speed, and giving commands as to whether the solenoids 32, 33 are turned on or off according to the table of the operated states of the shift solenoids.

Figure 9:
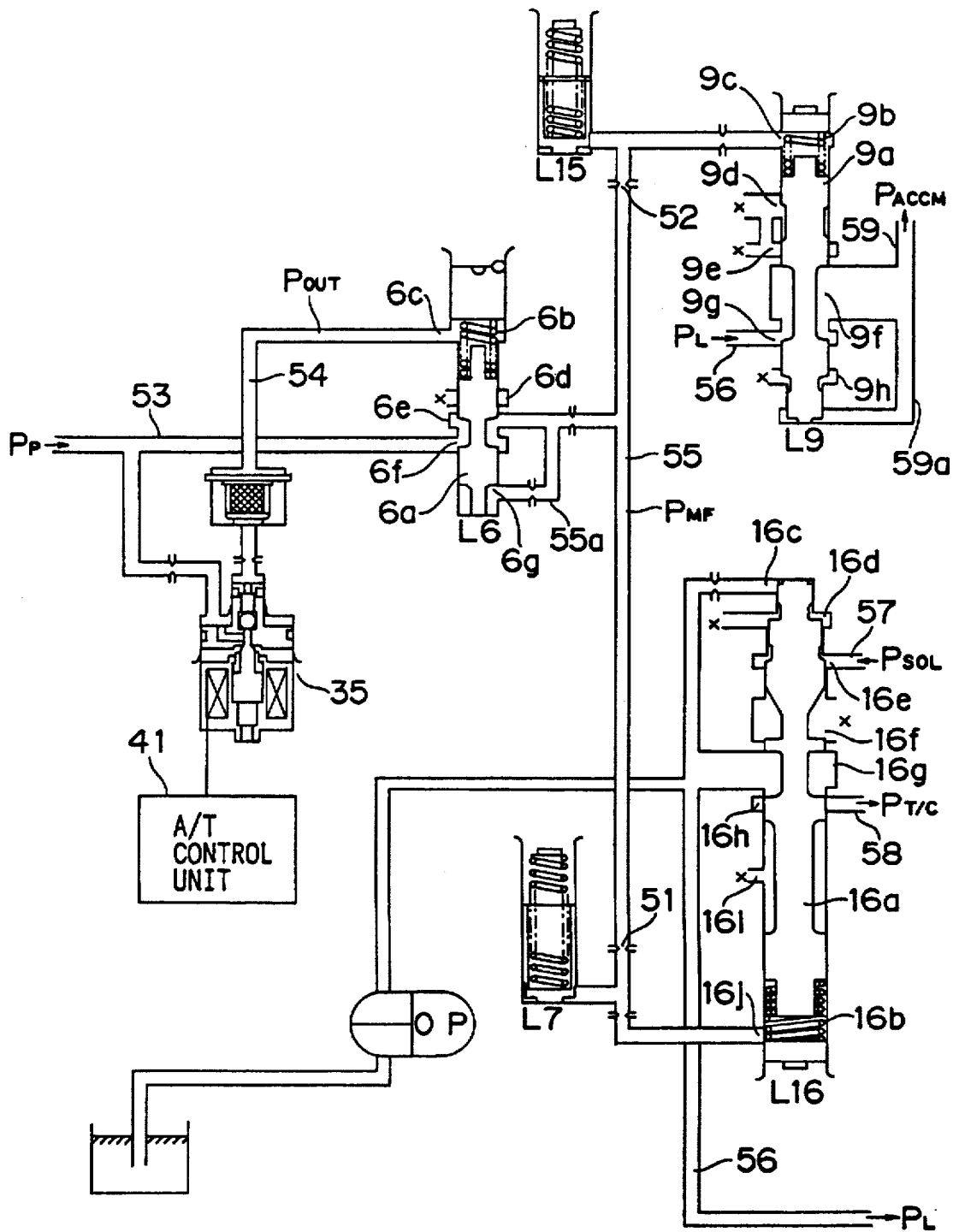
FIG. 9 is a hydraulic circuit diagram showing a principal part of a line pressure control device of the first embodiment.

FIG. 9 is a hydraulic circuit diagram showing a principal part of a line pressure control device, which includes the line pressure solenoid 35, A/T control unit 41, pressure modifier valve L6, oil pump O/P, pressure regulator valve L16, accumulator control valve L19, line pressure accumulator L7, and modifier accumulator L15. The line pressure control device further includes a line pressure orifice 51 and a modifier orifice 52.

The line pressure solenoid 35 is adapted to generate an output pressure POUT in response to a duty drive command from the A/T control unit 41, using the pilot pressure PP as a base pressure.

More specifically, the line pressure solenoid 35 generates an output pressure POUT depending upon the throttle opening while no shifting action takes place, and generates an output pressure POUT according to a selected shift mode when a shifting action takes place. In FIG. 9, 53 is a pilot pressure oil path, and 54 is a throttle pressure oil path.

The pressure modifier valve L6 is adapted to generate the modifier pressure PMF from the pilot pressure PP, using the output pressure POUT as an operating signal pressure. This valve L6 includes a spool 6a slidably inserted through a valve hole, a spring 6b for biasing the spool 6a downward as viewed in FIG. 9, and a throttle pressure port 6c, drain port 6d, modified pressure port 6e, pilot pressure port 6f, and feed-back modifier pressure port 6g, which are formed along the valve hole. In FIG. 9, 55 is a modifier pressure oil path, and 55a is a feed-back modifier pressure oil path.

The pressure regulator valve L16 is adapted to generate the line pressure PL by regulating the pressure of the oil discharged from the oil pump O/P. This valve L16 includes a spool 16a slidably inserted through a valve hole, a spring 16b for biasing the spool 16a upward as viewed in FIG. 9, and a feed-back line pressure port 16c, drain port 16d, solenoid pressure port 16e, drain port 16f, line pressure port 16g, torque converter pressure port 16h, drain port 16i, and modified pressure port 16j, which are formed along the valve hole. In FIG. 9, 56 is a line pressure oil path, 57 is a solenoid pressure oil path, and 58 is a torque converter pressure oil path.

The accumulator control valve L9 is adapted to regulate the line pressure PL into the accumulator control pressure PACCM, using a modifier pressure PMF as an operating signal pressure. This valve L9 includes a spool 9a slidably inserted through a valve hole, a spring 9b for biasing the spool 9a downward as viewed in FIG. 9, and a modifier pressure port 9c, drain ports 9d and 9e, accumulator control pressure port 9f, line pressure port 9g, drain port 9h, and feed-back accumulator control pressure port 9i, which are formed along the valve hole. In FIG. 9, 59 is an accumulator control pressure oil path, and 59a is a feed-back accumulator control pressure oil path.

The line pressure accumulator L7 and the line pressure orifice 51 serve to prevent pulsation of the modifier pressure PMF which occurs upon duty-cycle control of the pressure. The modifier accumulator L15 and the modifier orifice 52 also serve to prevent pulsation of the modifier pressure PMF which occurs upon duty-cycle control of the pressure.

Figure 10:
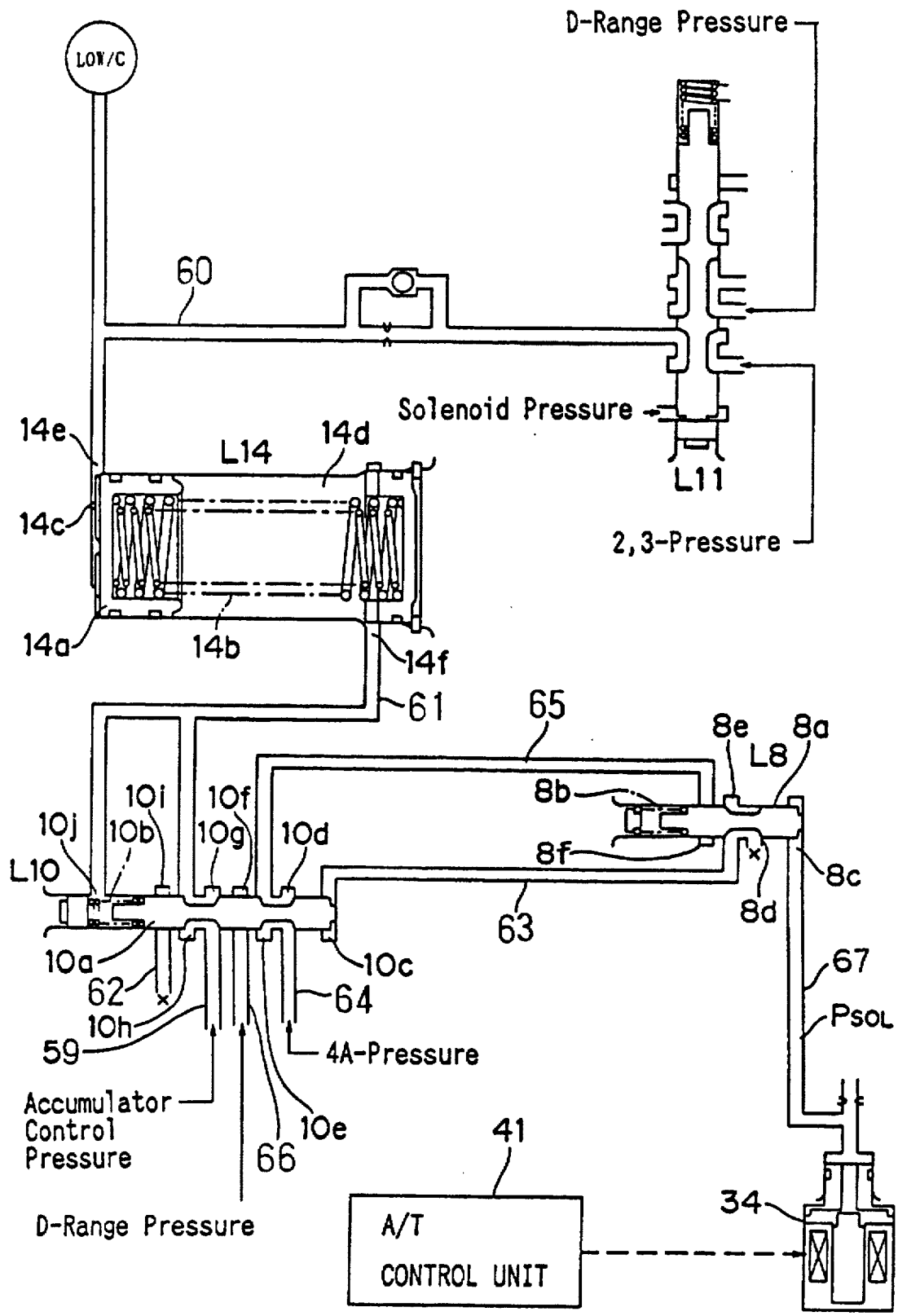
FIG. 10 is a hydraulic circuit diagram showing a principal part of an accumulator back pressure control device of the first embodiment.

FIG. 10 is a hydraulic circuit diagram showing a principal part of an accumulator back pressure control device, which includes the low clutch LOW/C (corresponding to an engaging element), shift valve B (L11), low clutch timing valve L8, low clutch sequence valve L10, timing solenoid 34, and the A/T control unit 41.

The low clutch accumulator L14 is disposed in the middle of a low clutch pressure oil path 60 extending from the shift valve B (L11) to the low clutch LOW/C. This clutch LOW/C is engaged when 1st-, 2nd- and 3rd-speed gear positions of the D (drive) range are selected, and is released when the 4th-speed gear position is selected.

The low clutch sequence valve L10 serves to communicate the accumulator back pressure oil path 61 communicating with the accumulator back pressure chamber 14d, with a selected one of the accumulator control pressure oil path 59 and the drain oil path 62. This valve L10 has a spool 10a slidably inserted through a valve hole, a spring for biasing 10b for biasing the spool 10a to the right in FIG. 10, and a signal pressure port 10c, 4A pressure port 10d, switch pressure port 10e, D-range pressure port 10f, accumulator control pressure port 10g, accumulator back pressure port 10h, drain port 10i, and feed-back pressure port 10j, which are formed along the valve hole.

The signal pressure port 10c is connected to a signal pressure oil path 63 extending from the low clutch timing valve L8. The 4A pressure port 10d is connected to a 4A pressure oil path 64 guiding a 4A pressure (4th-speed servo apply pressure), which is supplied to a band servo of the band brake B/B that is engaged in the 4th-speed gear position. The switch pressure port 10e is connected to a switch pressure oil path 65 leading to the low clutch timing valve L8. The D-range pressure port 10f is connected to a D-range pressure oil path 66.

The low clutch timing valve L8 is operated or switched using a solenoid pressure PSOL as an operating signal pressure, and includes a spool 8a slidably inserted through a valve hole, a spring 8b for biasing the spool 8a to the right in FIG. 10, and a solenoid pressure port 8c, drain port 8d, signal pressure port 8e, and switch pressure port 8f, which are formed along the valve hole. The solenoid pressure port 8c is connected to a solenoid pressure oil path 67.

The timing solenoid 34 is of a type which generates the solenoid pressure PSOL when it is energized or turned ON, and drains the solenoid pressure PSOL when it is not energized or turned OFF. This solenoid 34 is driven in a controlled manner by the A/T control unit 41.

The operation of the hydraulic control device of the first embodiment will be hereinafter explained.

Figure 11:
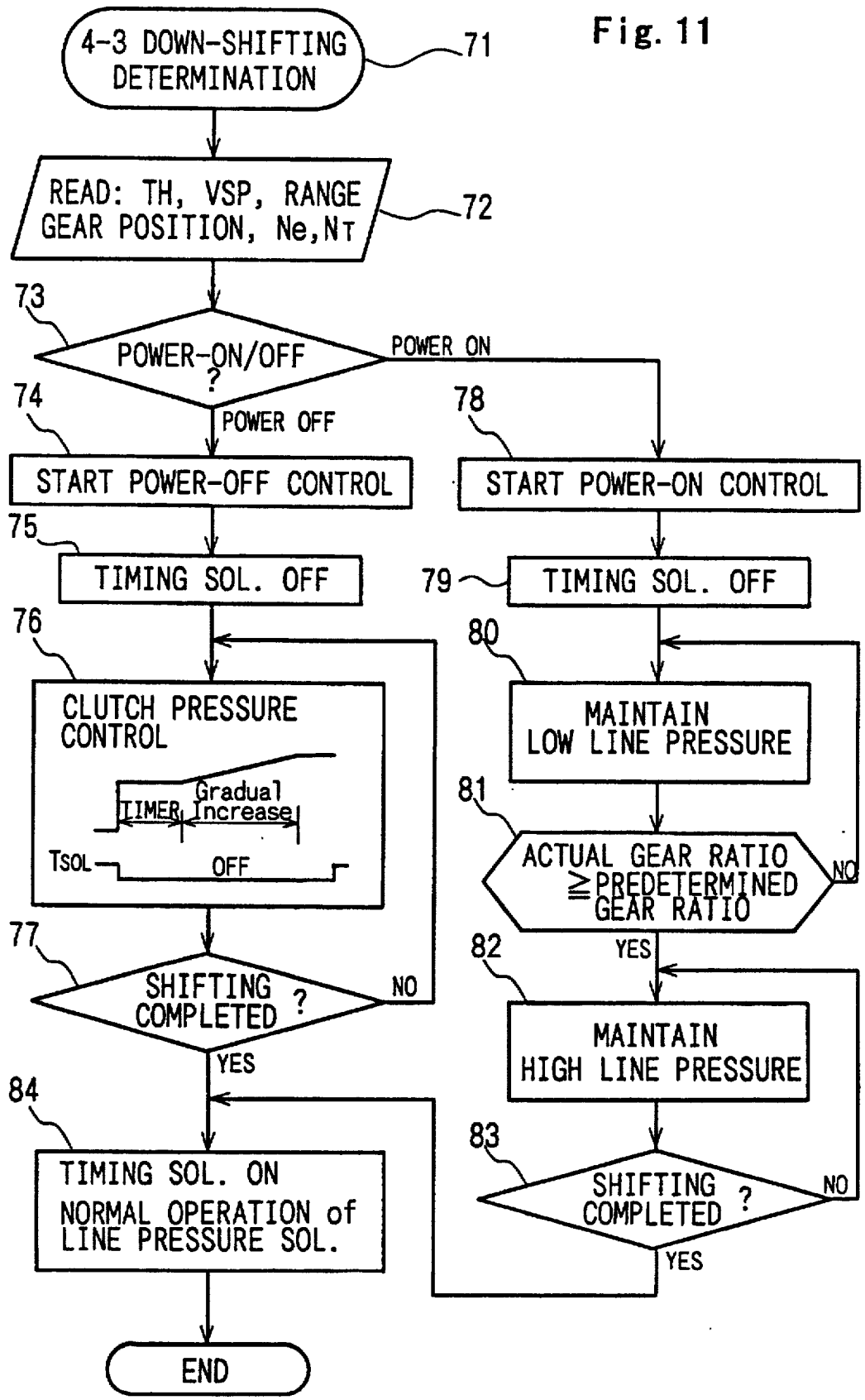
FIG. 11 is a flow chart showing the flow of a 4th-speed to 3rd-speed down-shifting control operation implemented by an A/T control unit of the first embodiment, in which the line pressure is controlled.

FIG. 11 is a flow chart showing the flow of a solenoid control operation implemented by the A/T control unit 41, for controlling the timing solenoid 34 and line pressure solenoid 35 when the low clutch LOW/C is engaged and the band brake B/B is released so that the transmission is shifted down from the 4th-speed to 3rd-speed gear position. Each step of this control flow will be described.

In step 71, it is determined whether the transmission is being shifted down from the 4th-speed to 3rd-speed gear position. This determination is based on the presence or absence of a 4-3 shift-down command signal that is generated when the current point representing the relationship between the throttle opening and the vehicle speed in the graph of FIG. 8 passes a 4-3 shift-down line as one of the gear change points shown in FIG. 8. This step 71 corresponds to down-shifting determining means.

Step 72 is then executed to read input information needed for determining whether the vehicle is in a power-on condition in which the driving force is transmitted from the engine to wheels through the power transmitting system, or in a power-off condition in which the driving force received from the wheels exceeds that received from the engine whereby braking force is applied to the power transmitting system. The input information includes a throttle opening TH, vehicle speed VSP, range position, gear position, engine speed Ne, and turbine speed NT.

In step 73, it is determined whether the vehicle is in the power-on condition or the power-off condition upon determination of down-shifting from the 4th-speed to 3rd-speed gear position. The determination is made such that the vehicle is in the power-off condition if the throttle opening TH read in step S72 is equal to or smaller than a predetermined value that is close to a road-load line (R/L line), and the vehicle is in the power-on condition if the throttle opening TH exceeds the predetermined value. While the lock-up clutch is not engaged, the vehicle is determined to be in the power-on condition if the engine speed Ne is equal to or greater than the turbine speed NT, and in the power-off condition if the engine speed Ne is lower than the turbine speed NT. This step S73 corresponds to power-on/off determining means.

If it is determined in step 73 that the vehicle is in the power-off condition, step 74 is then executed to start power-off control. In the next step 75, an OFF command is generated to turn off the timing solenoid 34 that has been placed in the ON state.

In step 76, the line pressure solenoid 35 receives duty-ratio control commands so as to carry out clutch-pressure control. This control is effected by controlling the duty ratio of the solenoid 35 such that the solenoid 35 is operated with a high duty ratio for a predetermined period of time measured by a timer immediately after determination of the down-shifting, and the duty ratio is gradually increased after the lapse of the predetermined period of time.

In step 77, it is determined whether the shift-down process is completed or not. This determination may be made upon a lapse of a given time (e.g., 1.5 sec.) measured by a timer from a point of time when the shifting is started, or may be made by confirming that the current gear ratio coincides with the 3rd-speed gear ratio to be established after the shift-down process. Steps 74–77 correspond to power-off hydraulic control means.

If it is determined in step 73 that the vehicle is in the power-on condition, step 78 is then executed to start power-on control. In the next step 79, an OFF command is generated to turn off the timing solenoid 34 that has been placed in the ON state.

In step 80, the line pressure solenoid 35 is operated with a low duty ratio so as to maintain a low line pressure. Step 81 is then executed to determine whether the actual gear ratio is equal to or larger than a predetermined gear ratio. The actual gear ratio is calculated as a ratio of the vehicle speed VSP (rotating speed of the output shaft of the transmission) to the turbine speed VT (rotating speed of the input shaft of the transmission). The predetermined gear ratio is preliminarily set as a value for achieving an optimum synchronized timing. For example, the predetermined gear ratio is set to a value around 0.90 when the gear ratio is 0.726 in the 4th-speed gear position, and 1.00 in the 3rd-speed gear position.

In step 82, the line pressure solenoid 35 is operated with a high duty ratio so as to maintain a high line pressure. In step 83, it is determined whether the shifting process is completed or not, as in step 77. Steps 78–83 correspond to power-on hydraulic control means.

In step 84, an ON command is generated to turn on the timing solenoid 34, and at the same time a command is generated to resume normal control of the line pressure solenoid 35 so that the output pressure POUT of this solenoid 35 is controlled depending upon the throttle opening.

When the transmission is shifted down from the 4th-speed to 3rd-speed gear position while a driver's foot is kept off from an accelerator pedal or an engine brake is selected, the control flow goes from steps 71, 72 and 73 to steps 74, 75 and 76 in this order in the flow chart of FIG. 11.

More specifically, the throttle opening (i.e., opening angle of the throttle valve) becomes zero if the driver's foot is released from the accelerator pedal, and it is determined that the 4th-speed to 3rd-speed shift-down action takes place in the power-off condition. In this case, an OFF command is generated to turn off the timing solenoid 34 until the shift-down action is completed. At the same time, the line pressure solenoid 35 is operated with a high duty ratio for a predetermined time measured by a timer immediately after the down-shifting is determined, and thereafter a command is generated to gradually increase the duty ratio.

As a result, an operating oil of the accumulator control pressure PACCM is supplied to the accumulator back pressure chamber 14d of the low clutch accumulator L14, through the low clutch sequence valve L10, so as to ensure the engaging capacity of the low clutch LOW/C.

Figure 12A:
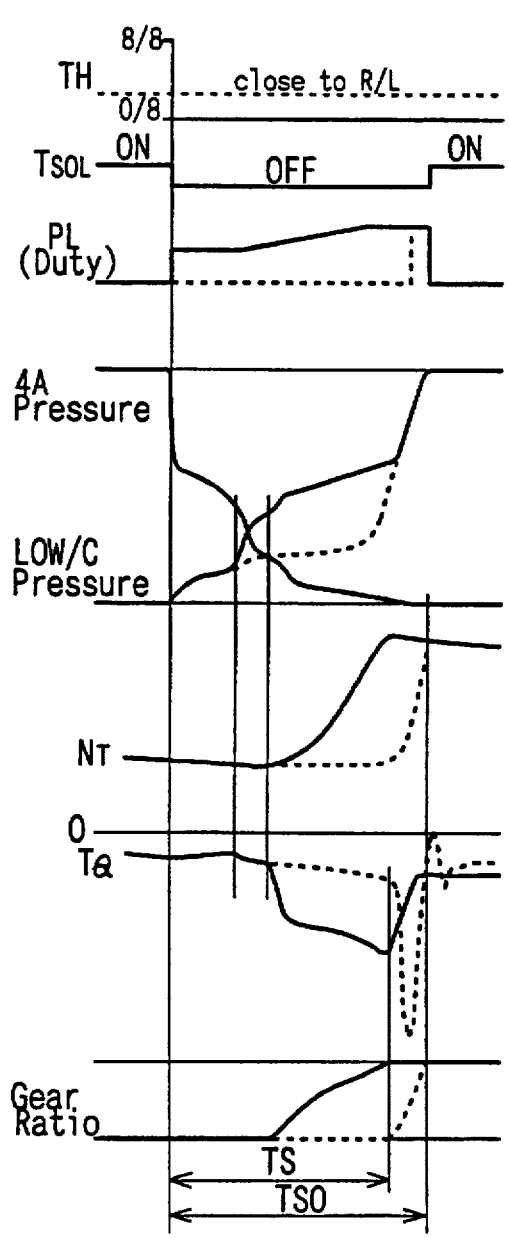
FIGS. 12A and 12B are time charts indicating down-shifting conditions during the 4th-speed to 3rd-speed down-shifting control operation effected by the A/T control unit of the first embodiment.

On the other hand, the low clutch pressure as an engaging control pressure supplied to the low clutch LOW/C is increased according to control of the line pressure immediately after the shifting is started, and maintained at a high level until the time immediately before the shifting is completed, as indicated by a solid line in FIG. 12A.

Upon down-shifting in the power off condition, therefore, the oil pressure applied to the low clutch LOW/C is rapidly established so as to raise the turbine speed NT at an early stage of the shifting operation, whereby the 3rd-speed gear ratio is established at the early stage of the shifting without accompanying abrupt changes in the transmission torque TQ. Thus the shifting time TS is reduced.

If the control to be effected in the power-on condition is effected in the power-off condition, namely, if the line pressure is kept at a low level until the actual gear ratio becomes equal to the predetermined level, and then increased so as to establish the low clutch pressure, the turbine speed NT is increased with a delay as indicated by a dashed line in FIG. 12A, since the turbine runner itself does not increase its speed NT in the power-off condition.

This prevents the transmission from effecting synchronized shifting with its input and output shafts being rotated in synchronization with each other, and a shock occurs due to an excessive capacity of the low clutch at the end of the time during which the accumulator pressure is kept at a steady-state level, as is apparent from a characteristic of the transmission torque TQ as indicated by a dashed line in FIG. 12A. The gear ratio is also increased with a delay, with a result of a prolonged shifting time TS0.

When the transmission is shifted down from the 4th-speed to 3rd-speed gear position in the power-on condition with the throttle valve being fully open, for example, the control flow goes from steps 71, 72 and 73 to steps 78, 79, 80, 81, 82 and 83 in this order in the flow chart of FIG. 11.

Figure 12B:
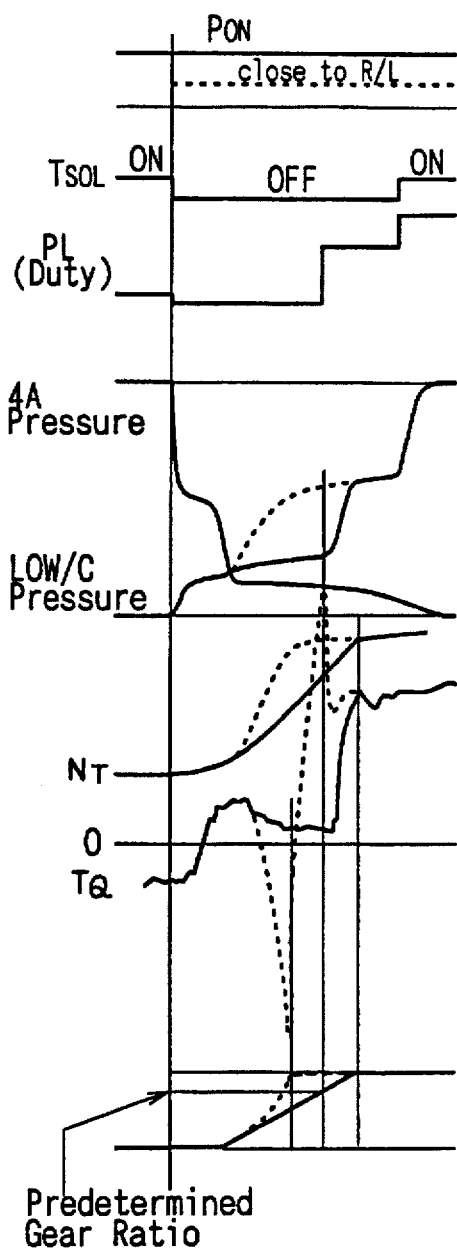

More specifically, when the throttle opening becomes 8/8 with the accelerator pedal being fully pushed down, it is determined that the 4th-speed to 3rd-speed shift-down action takes place in the power-on condition, and an OFF command is generated to turn off the timing solenoid 34 until the shift-down process is completed, as shown in FIG. 12B.

Upon determination of the down-shifting, a low-duty-ratio command is generated to operate the line pressure solenoid 35 with a low duty ratio until the gear ratio becomes equal to the predetermined value, and thereafter a high-duty-ratio command is generated to operate the line pressure solenoid 35 with a high duty ratio.

Although a sufficiently high level of the accumulator back pressure is ensured as in the case of the power-off downshifting, the accumulator control pressure PACCM is held at a low level while the low-duty-ratio command is generated with respect to the line pressure solenoid 35, and is held at a high level while the high-duty-ratio command is generated with respect to the line pressure solenoid 35. Thus, the steady-state level of the low clutch pressure (so-called shelf pressure) is determined depending upon the magnitude of the duty ratio of the line pressure solenoid 35.

On the other hand, the low clutch pressure is kept at a low level from the beginning of the shift-down process, according to the control of the line pressure, and then increased just before completion of the shifting, as indicated by a solid line in FIG. 12B.

Since the oil pressure to the low clutch LOW/C is kept at a low level upon down-shifting in the power-on condition, the transmission is held in a standby condition in which the low clutch is kept from engaging although a clutch piston is moved, so that the turbine speed is rapidly increased. The low clutch pressure is then increased immediately before completion of the shifting operation so as to engage the low clutch LOW/C at a point of time when the input and output shafts of the transmission rotate in synchronization with each other, thus reducing shift shocks.

If the control to be effected in the power-off condition is effected in the power-on condition, the turbine speed is increased to an excessive extent due to a rapid increase in the low clutch pressure in addition to rotation of the turbine runner itself in the power-on condition, resulting in a sharp drop in the transmission torque TQ as indicated by a dashed line in FIG. 12B.

There will be described effects of the present embodiment.

(1) In the hydraulic control device of the present embodiment, it is determined if the vehicle is in the power-on condition or power-off condition depending upon the throttle opening (opening angle of the throttle valve) TH, and, upon determination of the 4th-speed to 3rd-speed down-shifting in the power-off condition, the oil pressure to the low clutch LOW/C is rapidly increased from the beginning of the shifting, and then maintained at a high level until the shifting is about to be terminated. Upon determination of the 4th-speed to 3rd-speed down-shifting in the power-on condition, on the other hand, the oil pressure to the low clutch LOW/C is held at a low level from the beginning of the shifting, and then increased just before completion of the shifting operation. In this manner, a good shift feeling can be obtained upon 4th-speed to 3rd-speed down-shifting in both the power-on mode and the power-off mode.

(2) The throttle opening TH detected by the throttle sensor is located in either one of a power-on region and a power-off region on a power-on/off map (the uppermost map shown in FIGS. 12A, 12B) which is divided into the power-on and power-off regions by a dashed line representing a predetermined throttle opening (e.g., TH=⅛) that is close to the road-load (R/L) line. Thus, the power-on/off condition of the vehicle can be accurately determined depending upon which region in this map the detected throttle opening TH belongs to.

(3) In the present hydraulic control device, the line pressure supplied to the line pressure solenoid 35 is controlled so as to appropriately control the oil pressure to the low clutch LOW/C upon down-shifting from the 4th-speed to 3rd-speed gear position in the power-on and power-off conditions. By controlling the line pressure in the above-described manner, a good shift feeling can be obtained upon the 4th-speed to 3rd-speed down-shifting in both the power-on mode and the power-off mode.

There will be described the second embodiment of the hydraulic control device of the present invention which is adapted to control the low clutch pressure while operating the timing solenoid 34 for controlling the accumulator back pressure, when the transmission is shifted down from the 4th-speed to 3rd-speed position while the vehicle is in the power-on condition.

The construction of the automatic transmission in which the hydraulic control device of the second embodiment is used is the same as that of the transmission as shown in FIG. 2 and described above with respect to the first embodiment.

The operation of the hydraulic control device of the second embodiment will be hereinafter explained.

Figure 13:
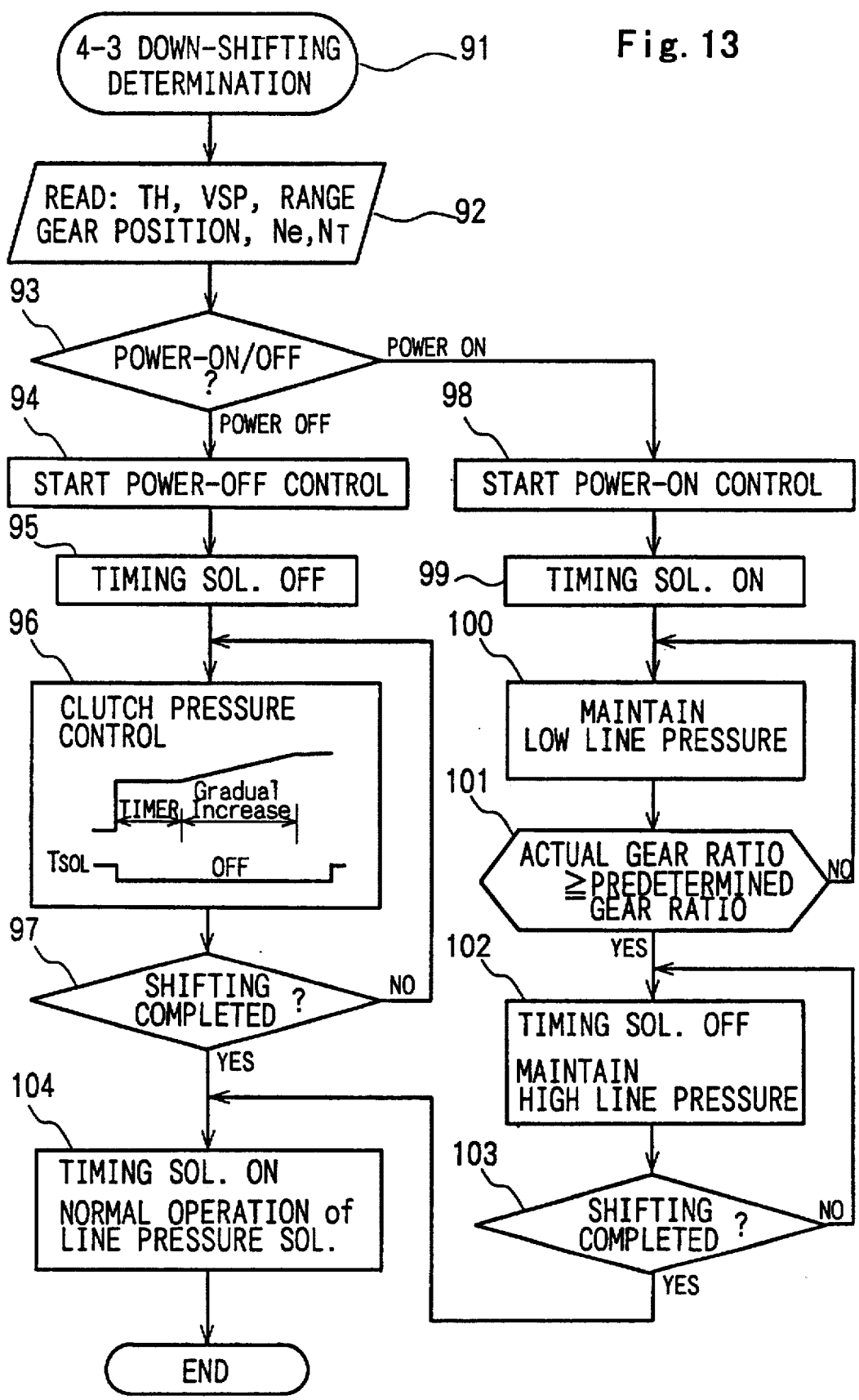
FIG. 13 is a flow chart showing the flow of a 4th-speed to 3rd-speed down-shifting control operation implemented by an A/T control unit of the second embodiment, in which the accumulator back pressure is controlled.

FIG. 13 is a flow chart showing the flow of a solenoid control operation implemented by the A/T control unit 41, for controlling the timing solenoid 34 and line pressure solenoid 35 when the low clutch LOW/C is engaged and the band brake B/B is released so that the transmission is shifted down from the 4th-speed to 3rd-speed gear position. Each step of this control flow will be described.

Steps 91–97 (corresponding to the power-off hydraulic control means) and step 104 are similar to steps 71–77 and 84 of the flow chart of FIG. 11, and thus will not be explained.

In step 98, the power-on control as described below is started when it is determined in step 93 that the vehicle is in the power-on condition. In step 99, an ON command that has been outputted to the timing solenoid 34 is maintained to keep the solenoid 34 in the ON state.

Step 100 is then executed to give a low duty ratio to the line pressure solenoid 35 so as to keep the line pressure at a low level. In the next step 101, it is determined whether the actual gear ratio is equal to or larger than a predetermined gear ratio as in step 81.

If an affirmative decision (YES) is obtained in step 101, step 102 is then executed to give a high duty ratio to the line pressure solenoid 35 so as to keep the line pressure at a high level. In step 103, it is determined if the shifting operation is completed, as in step 83. Steps 98–103 correspond to the power-on hydraulic control means according to the present invention.

Figure 14A:
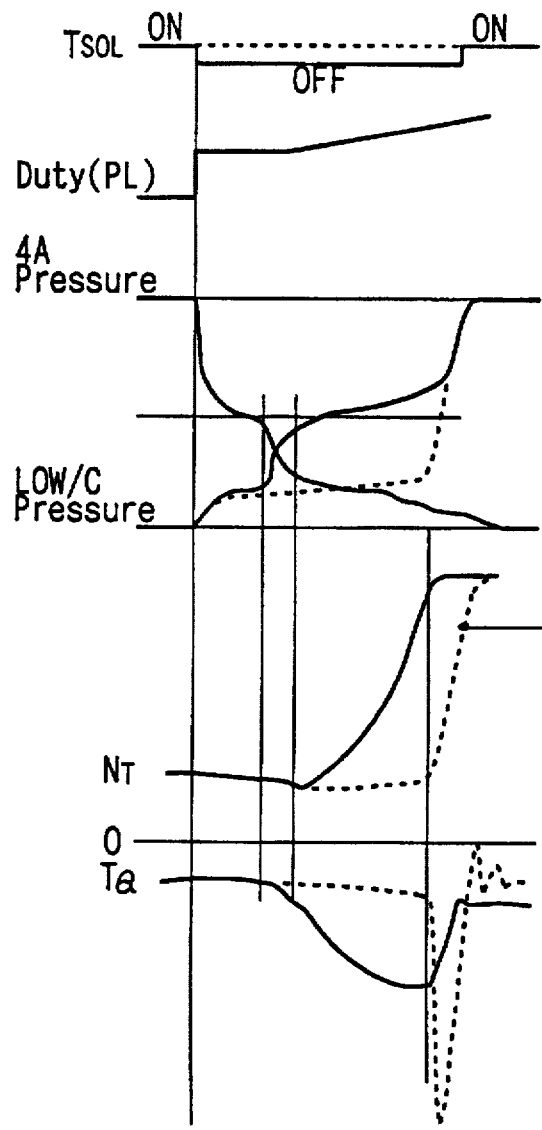
FIGS. 14A and 14B are time charts indicating down-shifting conditions during the 4th-speed to 3rd-speed down-shifting control operation effected by the A/T control unit of the second embodiment.

When the transmission is shifted down from the 4th-speed to 3rd-speed gear position in the power-off condition while a driver's foot is kept off from an accelerator pedal or an engine brake is selected, the control flow goes from steps 91, 92 and 93 to steps 94, 95 and 96 in this order in the flow chart of FIG. 13. As shown in FIG. 14A, the low clutch pressure is rapidly increased from the beginning of the shifting process according to the control of the line pressure, and is maintained at a high level until the shifting process is about to be completed, in the same fashion as shown in FIG. 12A of the first embodiment. At the same time, the turbine speed NT is raised at an early stage of the shifting process, so that the 3rd-speed gear ratio is established in the early stage of the shifting without accompanying any abrupt change in the transmission torque TQ. Thus the time TS required for the shifting operation is reduced.

When the transmission is shifted down from the 4th-speed to 3rd-speed gear position in the power-on condition with the throttle valve being fully open, for example, the control flow goes from steps 91, 92 and 93 to steps 98, 99, 100, 101, 102 and 103 in this order in the flow chart of FIG. 13.

Figure 14B:
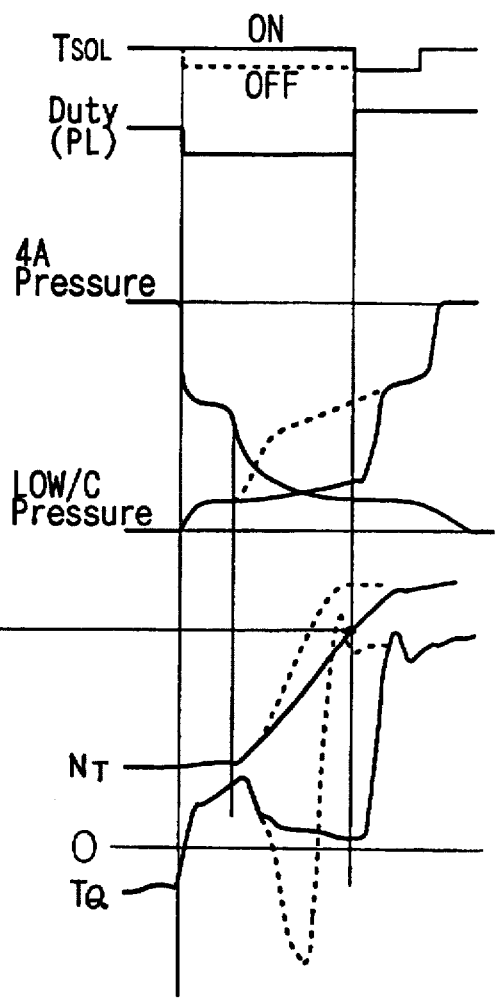

More specifically described referring to FIG. 14B, if it is determined that the 4th-speed to 3rd-speed shift-down action takes place in the power-on condition, an ON command is generated to keep the timing solenoid 34 in the ON state until the gear ratio becomes equal to a predetermined value, and an OFF command is then generated to turn off the solenoid 34 until the shifting operation is completed. The line pressure solenoid 35 receives a low-duty-ratio command, to be operated with a low duty ratio from the time of determination of the power-on down-shifting until the gear ratio reaches the predetermined value, and then receives a high-duty-ratio command so as to be operated with a high duty ratios a result, the low clutch pressure is kept at a low level from the beginning of the shifting process according to the control of the line pressure, and then increased just before completion of the shifting, as indicated by a solid line in FIG. 12B. Namely, the accumulator back pressure is kept released while the line pressure is kept at a low level from the time of determination of the down-shifting until the gear ratio becomes equal to the predetermined value, so as to maintain a low steady-state level of the low clutch pressure (i.e., a low shelf pressure). Immediately after the gear ratio reaches the predetermined value, the low clutch pressure is rapidly increased at the same time that the accumulator back pressure is established and the line pressure is increased.

Since the oil pressure to the low clutch LOW/C is kept at a low level upon the down-shifting in the power-on condition, the transmission is held in a standby condition in which the low clutch is kept from being engaged although a clutch piston is moved, so that the turbine speed is rapidly increased. The low clutch pressure is then increased just before completion of the shift-down operation so as to engage the low clutch LOW/C at a point of time when the input and output shafts of the transmission rotate in synchronization with each other, thus reducing shift shocks.

In addition to the effects (1) and (2) described above with respect to the first embodiment, the second embodiment yields the effect as follows. (4) In the hydraulic control device of the present embodiment, the timing solenoid 34 is operated in the manner as described above to control the accumulator back pressure, thereby to control the oil pressure supplied to the low clutch LOW/C upon down-shifting from the 4th-speed to 3rd-speed gear position in the power-on condition. Thus, the oil pressure to the low clutch LOW/C can be easily controlled by switching the solenoid 34 to the ON/OFF state to control the accumulator back pressure, assuring a good shift feeling upon the 4th-speed to 3rd-speed down-shifting in the power-on mode.

While the first and second embodiments are adapted to control the 4th-speed to 3rd-speed down-shifting operation, the hydraulic control according to the present invention is also applicable to 3rd-speed to 2nd-speed and 2nd-speed to 1st-speed down-shifting operations. When the automatic transmission has 1st-speed to 5th-speed gear positions, the hydraulic control according to the present invention may be applied to 5th-speed to 4th-speed and 5th-speed to 3rd-speed down-shifting operations.

Figure 15A:
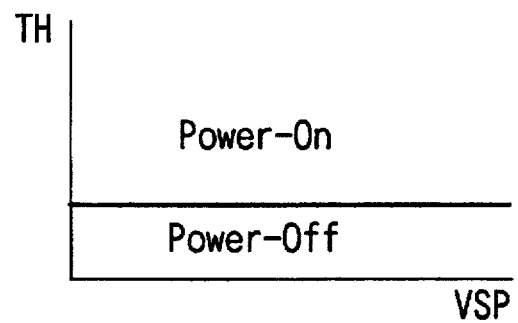
FIG. 15A - FIG. 15D are views showing various forms of power-on/off maps used for determining the power-on and power-off conditions.
Figure 15B:
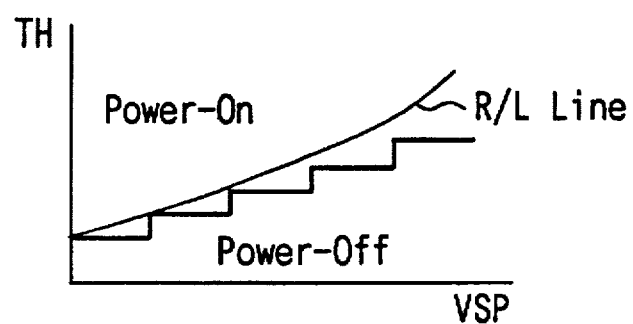
Figure 15C:
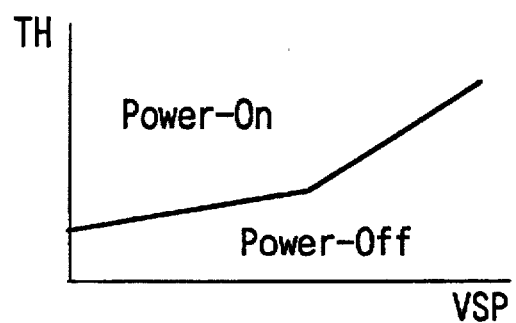

In the first and second embodiments, the power-on and power-off conditions are determined only on the basis of the throttle opening TH, using the power-on/off map as shown in FIG. 15A. However, the determination may be made using power-on/off maps as shown in FIGS. 15B and 15C each of which is divided into a power-on region and a power-off region depending upon the throttle opening TH and the vehicle speed VSP. In this case, the boundary between the power-on region and the power-off region is located close to the road-load line (R/L line), such that the power-off region expands as the vehicle speed increases. With these maps used, the power-on and power-off conditions can be determined with improved accuracy, taking account of increases in the friction or load in input and output systems due to the increase in the vehicle speed.

Figure 15D:
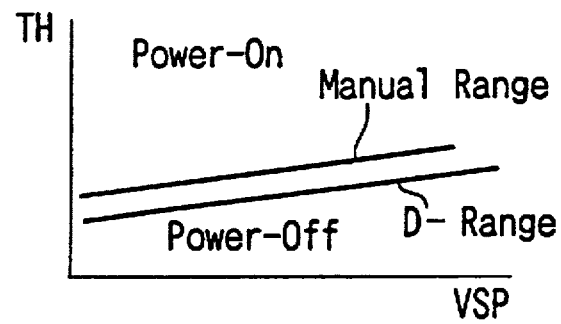

The power-on/off map or maps may be also individually prepared on the basis of at least one of the gear position, ON/OFF state of a lock-up clutch, selected range position, and oil temperature. When the gear position is selected, for example, the power-on region expands as the transmission is placed in the lower gear position in which the road-load line is present on the side of a relatively small opening angle of the throttle valve. When the ON/OFF state of the lock-up clutch is selected, the power-on range expands when the lock-up clutch is in the ON state in which shocks are desired to be reduced. When the range position is selected, as shown in FIG. 15D, the power-on range expands when the shift lever is placed in the D (drive) range in which shocks are desired to be reduced, and the power-off range expands when the shift lever is placed in the manual range in which the shifting time is desired to be reduced. In the case of the oil temperature, the power-off range expands when the oil pressure is low and the shifting time is desired to be reduced.

With the power-on/off map prepared on the basis of the above parameters, the power-on and power-off conditions may be more accurately determined in response to changes in the gear position, ON/OFF state of the lock-up clutch, range position and oil temperature.

The power-on/off condition of the vehicle may be also determined on the basis of the amount (flow rate or mass) of the intake air of the engine, instead of the throttle opening used in the first and second embodiments.

While the hydraulic control means for the low clutch LOW/C as the engaging element is adapted to control both the line pressure and the accumulator back pressure in the first and second embodiments, this hydraulic control means may be adapted to control only the line pressure by means of the line pressure solenoid, or only the accumulator back pressure by means of the timing solenoid.

What is claimed is:

1. A hydraulic control device for an automatic transmission of a vehicle comprising:

an engaging element that is engaged by a control oil pressure when the transmission is shifted down;

down-shifting determining means for determining whether the transmission is being shifted down;

power-on/off determining means for determining, upon determination of down-shifting of the transmission, whether the vehicle is in a power-on condition in which drive force is transmitted from an engine to wheels through a power transmitting system, or in a power-off condition in which the drive force received from the wheels exceeds that from the engine, whereby brake force is applied to the power transmitting system;

power-off hydraulic control means for regulating the control oil pressure applied to said engaging element, such that the oil pressure is rapidly increased from the beginning of a shifting process, and is maintained at a high level until the shifting process is about to be completed; and power-on hydraulic control means for regulating the control oil pressure applied to said engaging element, such that the oil pressure is maintained at a low level from the beginning of the shifting process, and is increased just before completion of the shifting process;

wherein said power-on/off determining means employs a power-on/off map which is divided into a power-on region and a power-off region on the basis of a throttle opening, and determines whether the vehicle is in the power-on condition or the power-off condition depending upon which region of said power-on/off map the throttle opening that is currently detected belongs to; and wherein said power-on/off map is prepared individually on the basis of at least one of a gear position, an ON/OFF state of a lock-up clutch, a range position, and an oil pressure.

2. A hydraulic control device for an automatic transmission of a vehicle comprising:

an engaging element that is engaged by a control oil pressure when the transmission is shifted down;

down-shifting determining means for determining whether the transmission is being shifted down;

power-on/off determining means for determining, upon determination of down-shifting of the transmission, whether the vehicle is in a power-on condition in which drive force is transmitted from an engine to wheels through a power transmitting system, or in a power-off condition in which the drive force received from the wheels exceeds that from the engine, whereby brake force is applied to the power transmitting system;

power-off hydraulic control means for regulating the control oil pressure applied to said engaging element, such that the oil pressure is rapidly increased from the beginning of a shifting process, and is maintained at a high level until the shifting process is about to be completed; and power-on hydraulic control means for regulating the control oil pressure applied to said engaging element, such that the oil pressure is maintained at a low level from the beginning of the shifting process, and is increased just before completion of the shifting process;

wherein said power-on/off determining means employs a power-on/off map which is divided into a power-on region and a power-off region on the basis of a throttle opening and a vehicle speed, and determines whether the vehicle is in the power-on condition or the power-off condition depending upon which region of said power-on/off map the throttle opening and vehicle speed that are currently detected belong to; and wherein said power-on/off map is prepared individually on the basis of at least one of a gear position, an ON/OFF state of a lock-up clutch, a range position, and an oil pressure.

3. A hydraulic control device as defined in claim 2, wherein said power-off hydraulic control means and said power-on hydraulic control means control a line pressure of the control oil pressure that is regulated by a pressure regulator valve.

4. A hydraulic control device for an automatic transmission of a vehicle;

an engaging element that is engaged by a control oil pressure when the transmission is shifted down;

down-shifting determining means for determining whether the transmission is being shifted down;

power-on/off determining means for determining, upon determination of down-shifting of the transmission, whether the vehicle is in a power-on condition in which drive force is transmitted from an engine to wheels through a power transmitting system, or in a power-off condition in which the drive force received from the wheels exceeds that from the engine, whereby brake force is applied to the power transmitting system;

power-off hydraulic control means for regulating the control oil pressure applied to said engaging element, such that the oil pressure is rapidly increased from the beginning of a shifting process, and is maintained at a high level until the shifting process is about to be completed; and power-on hydraulic control means for regulating the control oil pressure applied to said engaging element, such that the oil pressure is maintained at a low level from the beginning of the shifting process, and is increased just before completion of the shifting process;

wherein said power-off hydraulic control means and said power-on hydraulic control means controls a back pressure of the control oil pressure of an accumulator disposed in an oil path leading to said engaging element to be engaged upon down-shifting.

* * * * *